United States Patent
Koenig et al.

(10) Patent No.: US 11,591,774 B2
(45) Date of Patent: Feb. 28, 2023

(54) TRACK SPEED COMPENSATION FOR ENGINE SPEED DROOP

(71) Applicant: DEERE & COMPANY, Moline, IL (US)

(72) Inventors: Carl J. Koenig, Dubuque, IA (US); Blake A. Stork, Dubuque, IA (US); Bradley C. Dauderman, Dubuque, IA (US); Nathan A. Volkert, Dubuque, IA (US)

(73) Assignee: Deere & Company, Moline, IL (US)

( * ) Notice: Subject to any disclaimer, the term of this patent is extended or adjusted under 35 U.S.C. 154(b) by 366 days.

(21) Appl. No.: 16/912,234

(22) Filed: Jun. 25, 2020

(65) Prior Publication Data

US 2021/0404149 A1 Dec. 30, 2021

(51) Int. Cl.
*E02F 9/22* (2006.01)
*B62D 55/18* (2006.01)
(Continued)

(52) U.S. Cl.
CPC ............ *E02F 9/2253* (2013.01); *B60K 23/00* (2013.01); *B62D 21/02* (2013.01); *B62D 55/06* (2013.01);
(Continued)

(58) Field of Classification Search
CPC ...... B60K 17/10; B60K 23/00; B60K 7/0015; B60Y 2200/25; B60Y 2200/41; B60Y 2200/411; B62D 21/02; B62D 55/06; B62D 55/18; E02F 9/02; E02F 9/2004; E02F 9/2012; E02F 9/2221; E02F 9/2253
See application file for complete search history.

(56) References Cited

U.S. PATENT DOCUMENTS

| 4,542,802 A | 9/1985 | Garvey et al. |
| 4,663,713 A | 5/1987 | Cornell et al. |

(Continued)

FOREIGN PATENT DOCUMENTS

| DE | 112011103978 T5 | 10/2013 |
| DE | 112013005124 T5 | 8/2015 |
| WO | WO17027404 A1 | 2/2017 |

OTHER PUBLICATIONS

German Search Report issued in application No. DE102021205309.2 dated Feb. 14, 2022 (06 pages).

*Primary Examiner* — Tyler J Lee

(57) ABSTRACT

A system and method for compensating reduced track speed because of engine droop for a work machine is disclosed. The system may comprise a frame, an attachment coupled to the frame, a ground-engaging mechanism adapted to support the frame, an engine, a motor, a track speed sensor, an engine speed sensor, and a controller. The engine may drive the ground-engaging mechanism and attachment. The engine may be coupled through a variable speed transmission to the ground-engaging mechanism and the attachment. They variable speed transmission may include a hydrostatic circuit. The controller may be adapted to send an increased transmission command signal based on a drop in the engine speed signal when the work machine engages an increased load. The increased transmission command signal may increase a motor speed to cause an increase in track speed to compensate at least a portion of the reduced track speed from the engine speed droop.

20 Claims, 5 Drawing Sheets

(51) Int. Cl.
  *B62D 21/02*     (2006.01)
  *B60K 23/00*     (2006.01)
  *B62D 55/06*     (2006.01)
  *E02F 9/20*      (2006.01)
  *E02F 9/02*      (2006.01)

(52) U.S. Cl.
  CPC ............ *B62D 55/18* (2013.01); *E02F 9/2004* (2013.01); *E02F 9/2221* (2013.01); *B60Y 2200/41* (2013.01); *E02F 9/02* (2013.01)

(56) References Cited

U.S. PATENT DOCUMENTS

| | | |
|---|---|---|
| 8,718,884 B2 | 5/2014 | Hou |
| 8,838,348 B2 | 9/2014 | Oouchida et al. |
| 9,187,093 B1 | 11/2015 | Sujan |
| 9,316,310 B2 * | 4/2016 | Kinugawa ............. F16H 61/468 |
| 2009/0000156 A1 * | 1/2009 | Hartwick .................. E02F 9/26 180/6.7 |
| 2009/0000157 A1 * | 1/2009 | Hartwick ............. B62D 11/001 60/368 |
| 2013/0036729 A1 * | 2/2013 | Kinugawa ............. F16H 61/468 60/446 |
| 2021/0054598 A1 * | 2/2021 | Kukuk ................... E02F 9/166 |

* cited by examiner

TRACK SPEED COMPENSATION FOR ENGINE SPEED DROOP

CROSS-REFERENCE TO RELATED APPLICATIONS

N/A

FIELD OF THE DISCLOSURE

The present disclosure relates to a work machine and method for track speed compensation for engine speed droop.

BACKGROUND

In the construction industry (and others), various work machines are operated to perform various tasks at a work site. For example, crawler dozers (hereafter "dozers"), motor graders, and other bladed vehicles are well-suited for spreading, shearing, carrying, and otherwise moving relatively large volumes of earth. Typically, on the work machine, the transmission ratio is held constant during initial engagement with a load. Thereby an increase in load may cause a droop in engine speed. This droop in engine speed may generate a relatively jerky experience for the operator as the engine speed "catches up" to meet load demand. Therein lies a need for a smoother transition during changes in load.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes an apparatus and system which allows for a work machine to meet increases in load for work machine to compensate for a loss in speed for the ground-engaging mechanism.

According to an aspect of the present disclosure, a system for compensating reduced track speed because of an engine speed droop for work machine is disclosed. The system may comprise of a frame, an attachment coupled to the frame, a ground-engaging mechanism adapted to support the frame, an engine, a motor, a track speed sensor, an engine speed sensor, and a controller. The engine may drive the ground-engaging mechanism and the attachment. The engine may be coupled through a variable speed transmission to the ground-engaging mechanism and the attachment. The variable speed transmission may include a hydrostatic circuit. The hydrostatic circuit may include a pump. The motor may be adapted to further drive the ground-engaging mechanism. The track speed sensor may be adapted to detect a track speed of the ground-engaging mechanism and generate a track speed signal. The engine speed sensor may be adapted to detect an engine speed and generate an engine speed signal. A controller may be adapted to send an increased transmission command signal based on a drop in the engine speed signal when the work machine engages an increased load. The increased transmission command signal may increase a motor speed to cause an increase in track speed to compensate at least a portion of the reduced track speed from the engine speed droop.

The increased transmission command signal may cause one or more of an increase in pump flow and a decrease in motor displacement.

The system may further comprise an operator interface control adapted to receive an operator input. The operator input may include a multiplicative factor for one or more of the increased transmission command signal and a target track speed based on the drop in the engine speed signal. The multiplicative factor may comprise a first setting, a second setting, and third setting. The first setting may include an off position. The second setting may include a multiplicative factor of 1:1. The third setting may include a multiplicative factor of X:1. The multiplicative factor of X may be predefined.

The drop in the engine speed signal may be identified by an inflection point in a torque-engine speed curve.

The increased transmission command signal may be based on the engine speed signal and a target track speed.

The drop in the engine speed signal may be anticipated through a sensory device coupled to the work machine.

The drop in the engine speed signal may be anticipated by a rate of change in the engine speed droop.

The increased load may result from one or more of the attachments engaging a payload, a ground conditions profile, and the steering of the work machine.

The increased transmission signal may only apply when the engine speed signal is above an anti-stall threshold.

According to an aspect of the present disclosure, a method of compensating reduced track speed because of an engine speed droop for a work machine may include one or more of the following steps: determining, by an engine speed sensor of the work machine, an engine speed associated with the work machine; determining, by a controller of the work machine, if the engine speed is above an anti-stall threshold; determining, by a track speed sensor of the work machine, a track speed of a ground-engaging mechanism of the work machine;

receiving by the controller an operator input from an operator interface control, the operator input including a multiplicative factor for one or more of an increased transmission command signal and a target track speed when a drop in the engine speed occurs; detecting a drop in the engine speed signal; calculating an increase in the transmission command signal by the controller based on one or more of the engine speed, the operator input, and a target track speed; and generating an increase in the transmission command signal for increasing a motor speed to cause an increase in track speed to compensate at least a portion of the reduced track speed from the engine speed droop.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

DETAILED DESCRIPTION

Figure 1:
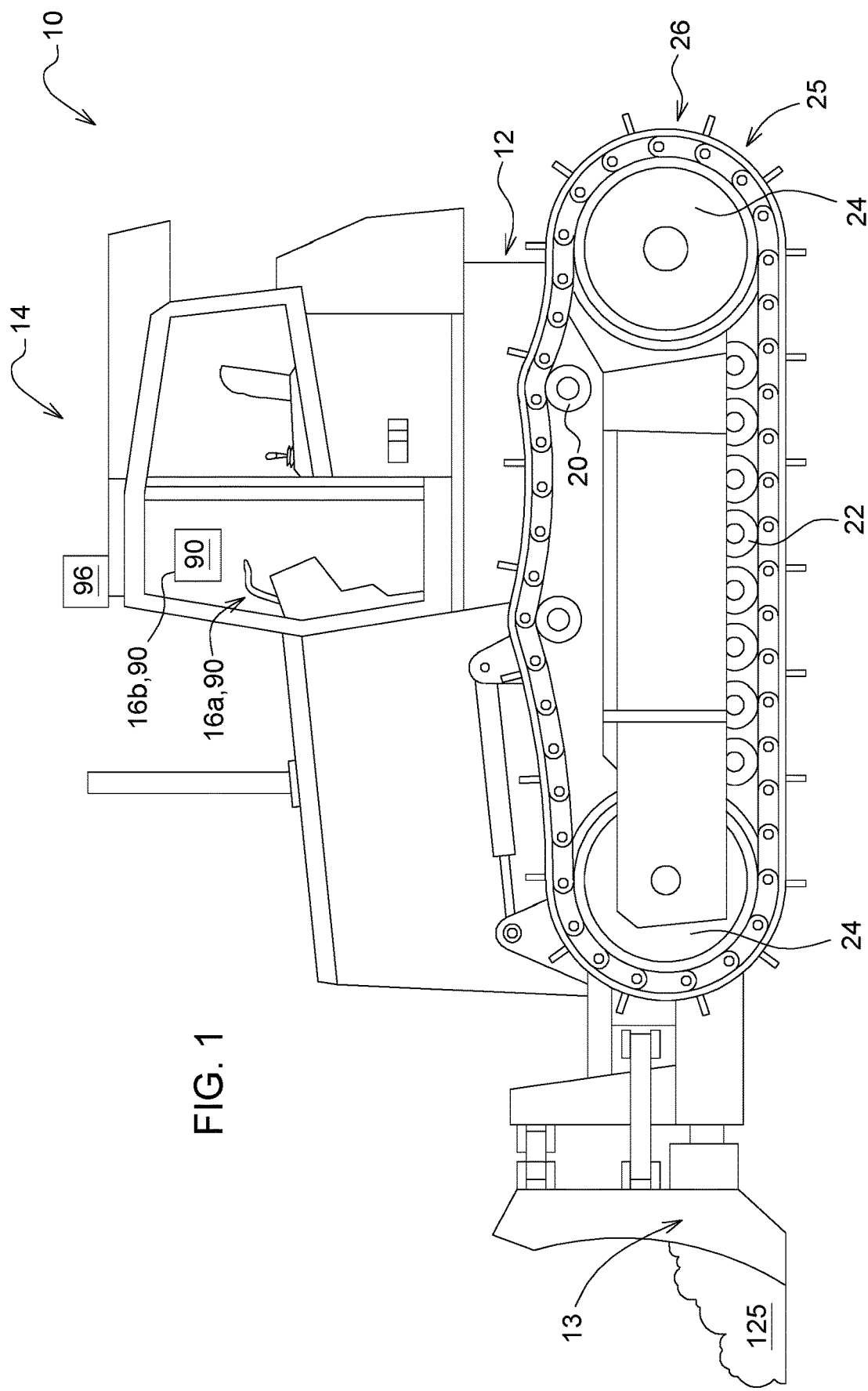
FIG. 1 is a side view of an exemplary embodiment.

The following describes one or more example embodiments of the disclosed system and method, as shown in the accompanying figures of the drawings described briefly above.

Various modifications to the example embodiments may be contemplated by one of skill in the art.

As used herein, unless otherwise limited or modified, lists with elements that are separated by conjunctive terms (e.g. "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g. A and B; B and C; A and C; or A, B, and C).

As used herein, the term controller refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of work machines, and that the crawler dozer described herein is merely one exemplary embodiment of the present disclosure.

For the sake of brevity, conventional techniques related to signal processing, data transmission, signaling, control, and other functional aspects of the system (and the individual operating components of the systems) may not be described in detail herein. Furthermore, the connecting lines shown in the various figures contained herein are intended to represent example functional relationships and/or physical coupling between the various elements. It should be noted that many alternative or additional functional relationships or physical connections may be present in an embodiment of the present disclosure.

Discussion herein may focus on the exemplary embodiment and method of a crawler dozer. In other applications of the disclosed system and method, other configurations are also possible. For example, work machines in some embodiments may be configured as various work machines with attachments such as motor graders, skid-steer loaders or similar machines. Further, work machines may be configured as machines other than construction vehicles, including machines from agriculture, forestry and mining industries, such as tractors.

FIG. 1 illustrates the work machine 10 (hereinafter also referred to as a "crawler dozer") including a frame 12, an attachment 13 coupled to the frame 12, and a cab 14 supported by the frame 12. A ground-engaging mechanism 26 may be adapted to support the frame 12. The ground-engaging mechanism 26 may contain top rollers 20, bottom rollers 22, sprockets and/or idlers 24, and twin tracks 25. In further embodiments, the ground-engaging mechanism 26 can be replaced by a different type of mechanism including wheels, friction or positively-driven belts, or another mechanism suitable for moving the crawler dozer 10 across a tract of land, such as off-road terrain. The attachment 13 may comprise of a blade including a lower cutting edge. The attachment 13 may be mounted to a forward portion of the frame by an outer control linkage 18, which is constructed of various links, joints, and other structural elements. The linkage 18 may include, for example, a push frame joined to the frame 12 at pivot points.

Figure 2:
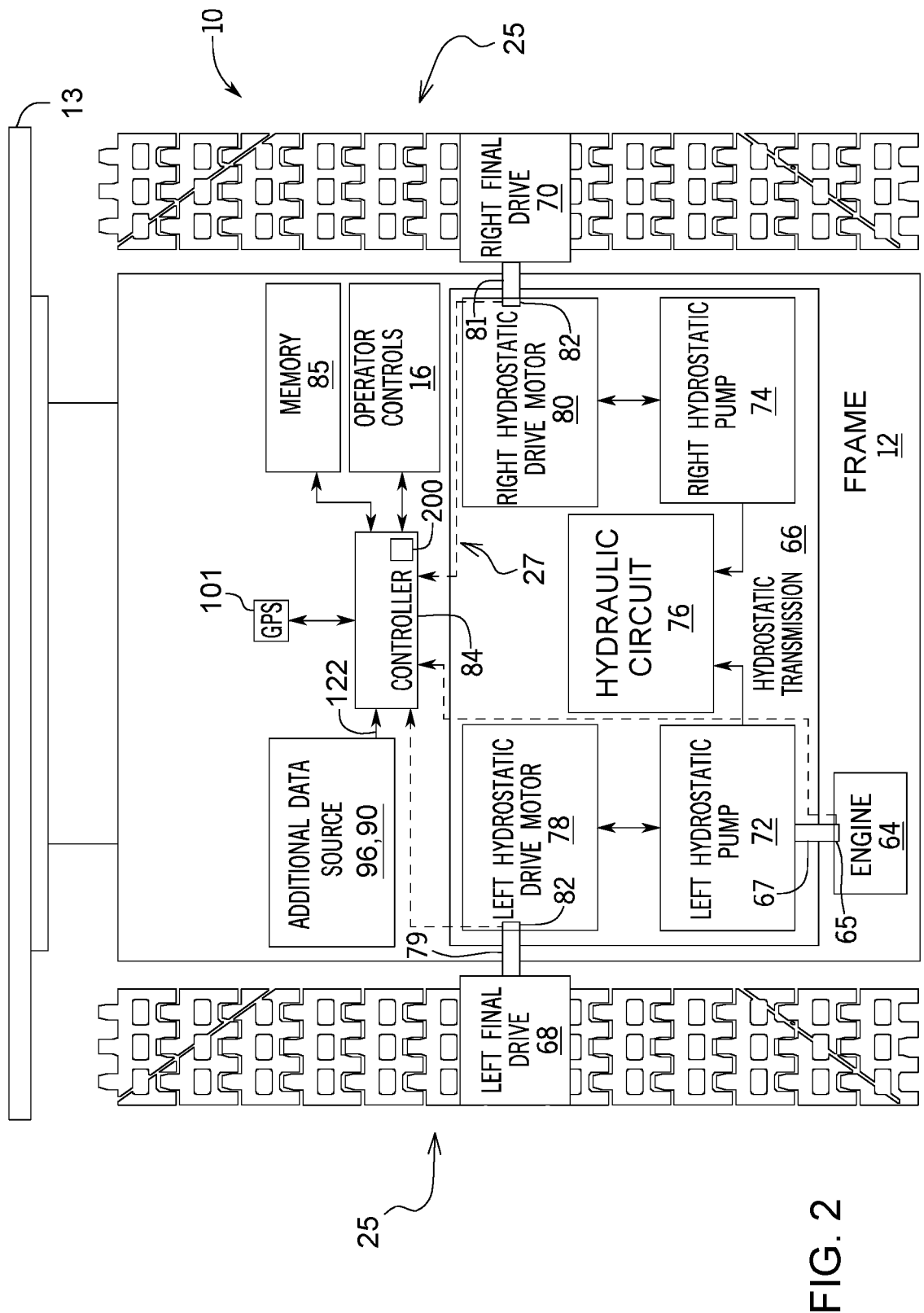
FIG. 2 is a schematic of the crawler dozer, according to one embodiment shown in FIG. 1.

Advancing now to FIG. 2 with continued to reference to FIG. 1, a schematic of the exemplary crawler dozer 10 is shown. Here it can be seen that the crawler dozer 10 includes a number of additional components beyond those previously described in FIG. 1. Such additional components, for example, can include an engine 64 for driving the ground-engaging mechanism 26 and positioning of the attachment 13 relative to the frame 12. The engine 64 may be coupled through a variable speed transmission 66 to the ground-engaging mechanism 26 (i.e. in this embodiment, a left final drive 68, and a right final drive 70 with tracks 25) and the attachment 13. The variable speed transmission 66 may include a variable speed circuit 76. The hydrostatic circuit 76 may include a pump (i.e. a left hydrostatic pump 72, a right hydrostatic pump 74). During operation of the crawler dozer 10, the engine 64 drives rotation of the track 25 through the variable speed transmission 66 and the final drives (68, 70). In one example, the rotating mechanical output of the engine 64 drive left and right hydrostatic pumps (72, 74) that may be included within the variable speed transmission 66. The hydrostatic pumps (72, 74) are fluidly interconnected through other fluid-conducting components in the hydrostatic circuit 76, such as filters, reservoirs, heat exchangers, and the like.

A motor (in this embodiment, a left hydrostatic motor 78, a right hydrostatic motor 80) may be adapted further drive the ground-engaging mechanism 26. The hydrostatic pumps 72, 74 are further fluidly coupled to and drive the motor (78, 80) contained with the variable speed transmission 66. The mechanical output shafts (79, 81) of the motors (78, 80) then drive rotation of the tracks 25 through the final drives (68, 70). The engine 64 and the power train of the crawler dozer 10 may vary in other embodiments. One or more motor sensors 82 may be further included in the motor (78, 80). The motor sensors 82 each include a sensor for monitoring the speed of the respective shaft (79, 81) of the motors (78, 80). During operation of the crawler dozer 10, the motor sensors 82 may observe the output shafts 79, 81 associated with the motor 78, 80 and generate motor sensor signals 27 or sensor data based thereon, which is communicated to the controller 84 onboard the crawler dozer 10.

A track speed sensor 30 may be adapted to detect a track speed 32 of the ground-engaging mechanism 26 and generate a track speed signal 34. A track speed sensor 30 observes a track speed of the work machine 10, such as rotation of the ground-engaging mechanism 26 (or tracks 25, or components thereof) associated with the work machine 10. The track speed sensor may further be coupled to a global positioning system, a sensor associated with the ground speed or velocity of the work machine 10 and generate track speed signal 34 based thereon, which may be received and processed by the controller 84 to determine a track speed 32 of the work machine 10. The work machine track speed 32 may differ from a ground speed of the work machine due to slip in the tracks.

At least one engine speed sensor 65 is associated with the engine 64. An engine speed sensor 65 observes an operational speed of the engine 64, such as a rotation speed of an output shaft 67 associated with the engine 64 and generates engine sensor signals based thereon, which may be received and processed by the controller 84 to determine a speed of the engine 64. That is, the engine speed sensor 65 may be adapted to detect an engine speed 85 and generate an engine speed signal 52.

The one or more controllers 84 are schematically represented in FIG. 2 by a single block 84 although the controller 84 can include any number of processing devices, which can be distributed throughout the crawler dozer 10 and interconnected utilizing different communication protocols and memory architectures. The controller 84 (or others) may be configured as a computing device with associated processor devices and memory architectures 85, as a hard-wired computing circuit (or circuits), as a programmable circuit, as a hydraulic, electrical or electro-hydraulic controller, or otherwise. As such, the work vehicle controller 84 may be configured to execute various computational and control functionality with respect to the crawler dozer 10 (or other machinery). In some embodiments, the controller 84 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 84 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

Figure 3:
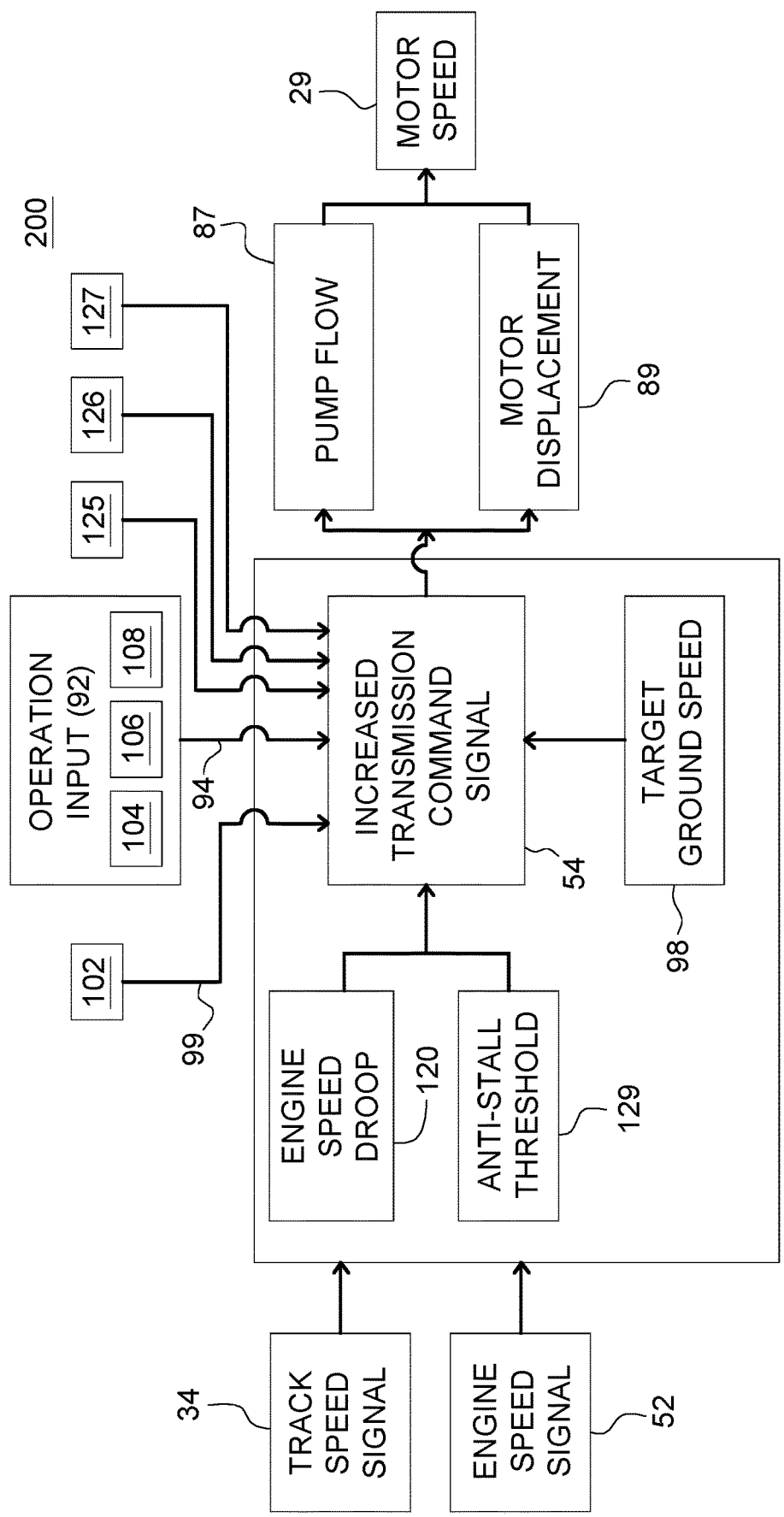
FIG. 3 is a dataflow diagram illustrating an example system for the work machine of FIG. 1 according to various embodiments.

Referring to FIG. 3 with continued reference to FIG. 2, in the system 200, the controller 84 may be adapted to send an increased transmission command signal 54 based on a drop in the engine speed signal 52 when the work machine 10 engages an increased load. The increased transmission command signal 54 increases a motor speed 29 to cause an increase in track speed 32 to compensate at least a portion of the reduced track speed 32 from the engine speed droop. The increased transmission command signal 54 may cause one or more of an increase in pump flow 87 and a decrease in motor displacement 89. The increased transmission command signal 54 may occur at, immediately before, or immediately after the drop in the engine speed signal 52. Note the drop in the engine speed signal 52 may sudden, gradual, anticipated, or detected, to name a few. The controller 84, advantageously uses the increased transmission command signal 54 to soften the transition to accommodate the increased load on the work machine 10 without increasing the engine speed signal 52, thereby improving the comfort to the operator. Furthermore, the target track speed 32 may advantageously differ from a first track to a second track thereby addressing any increased load observed during track slippage, and turning of the work machine 10.

An operator interface control 90 may be adapted to receive an operator input 92. The operator input 92 including a multiplicative factor 94 for one or more of the increased transmission command signal 54 and a target track speed 98 based on the drop in the engine speed signal 52. In one embodiment, the target track speed 98 may comprise of a target motor speed (i.e. the speeds of the left hydrostatic motor 78 and the right hydrostatic motor 80). Generally, the operator interface control 90 may include one or more joysticks, such as the joystick 16a (shown in FIG. 1), various switches or levers, one or more buttons, a touchscreen interface 16b (shown in FIG. 1) that may be overlaid on a display, a keyboard, a speaker, a microphone associated with a speech recognition system, control pedals, or various other human-machine interface devices. The operator may actuate one or more devices of operator interface control 90 for purposes of operating the crawler dozer 10, and for providing operator input 92 to the system 200 for compensating reduced track speed because of engine speed droop 120 and the method 400 outlined in the disclosure. In this example, the multiplicative factor 94 may be selected from a form of the embodiments of the above-mentioned operator interface controls 90. In a first embodiment, the operator interface control 90 may comprise of a touchscreen 16b. In another embodiment, the operator control may comprise of a series of buttons, or alternatively, a dial.

The multiplicative factor 94 may comprise a first setting 104, a second setting 106, and a third setting 108. The first setting 104 may include an off position. The second setting 106 may include a multiplicative factor 94 of 1:1. The third setting 108 may include a multiplicative factor 94 of X:1 wherein the multiplicative factor 94 of X may be one or more of pre-defined or user selected. In one exemplary embodiment, third setting 108 in a pre-defined scenario may include a multiplicative factor of 1.1:1; or 1.3:1; or 2:1; but preferably 1.5:1; for example. The multiplicative factor 94 may represent the ratio of a target track speed 98 from pre-load engagement and post-load engagement. The target track speed 98 may be derived from a target track speed, or alternatively a sensor adapted to determine a target track velocity of the work machine 100.

Figure 4:
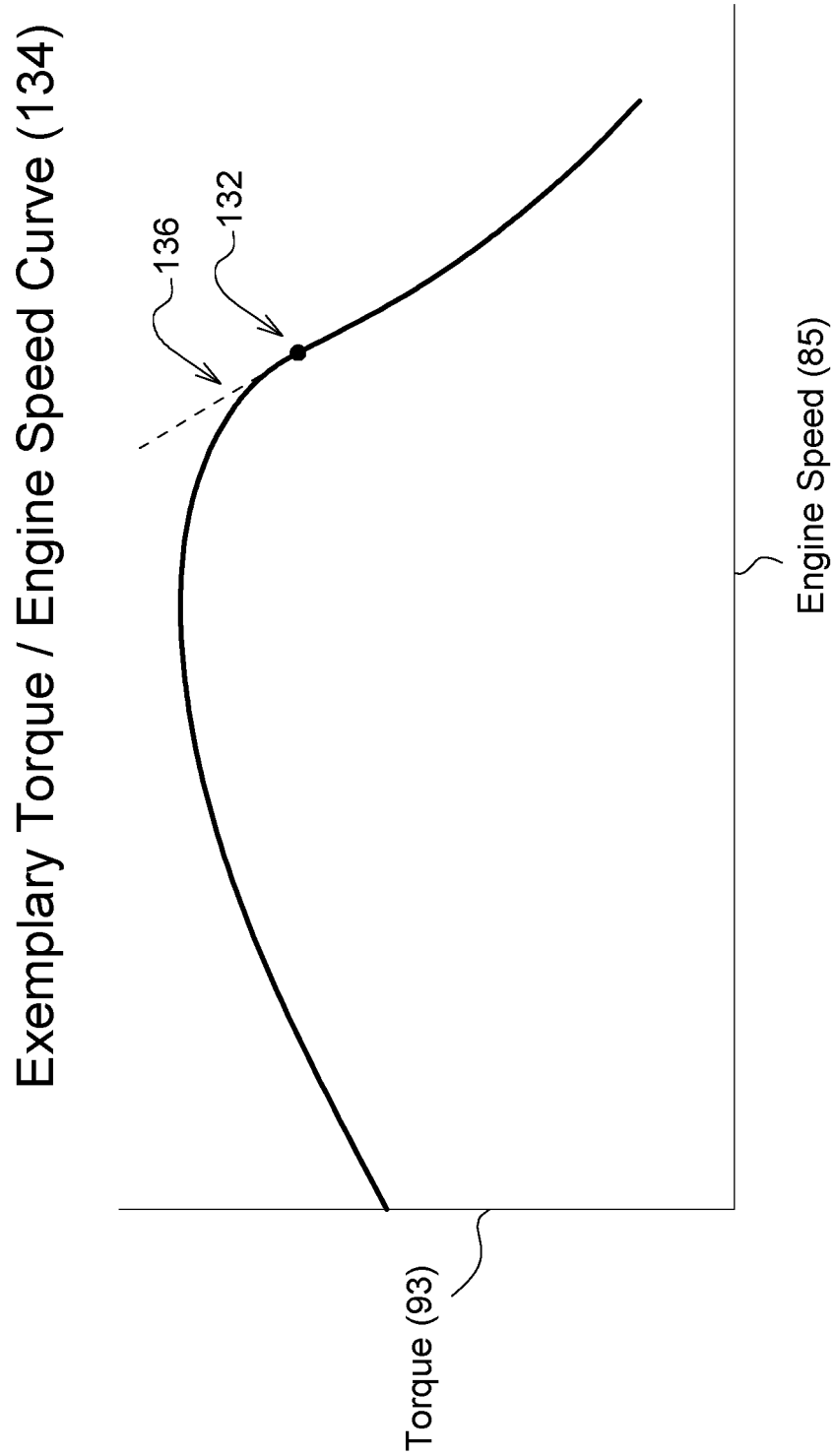
FIG. 4 is an exemplary torque-engine speed curve.

Now further referring to FIG. 4, an exemplary torque-engine speed curve is shown. The drop in the engine speed signal 52 may be identified by an inflection point 132 in a torque-engine speed curve 134.

The increased transmission command signal 54 may be based on the engine speed signal 52 and a target track speed 98.

The drop in the engine speed signal 52 may be anticipated by a rate of change in speed droop 120. The rate of change of engine speed droop 120 may be derived from the slope 136 of the torque-engine speed curve 134.

Now returning to FIGS. 1 and 2, the drop in the engine speed signal 52 may additionally or alternatively be anticipated through data inputs 122 from a sensory device 96 coupled to the work machine 10 which, are further coupled to one or more inputs of the controller 84 and which can be distributed across the infrastructure of the work machine 10. The sensory device 96 may include any number of sensors generating data that may be utilized by the work vehicle controller 84 in performing embodiments of the above-mentioned system 200 for compensating reduced track speed 32 because of engine speed droop 120. In one example, one or more of these sensory devices 96 associated system may include one or more of a forward facing camera, lidar, radar, sonar, piezoelectric feedback, load sensor coupled to the attachment, GPS to determine track speed, to name a few. The sensory device 96 may also be adapted to detect the degree to which the work machine 10 is steered when turning. Detection of the degree to which the work machine 10 is turned when steering may include identifying a differential in track speed 32 from a first track to a second track.

The increased load may result from one or more of the attachment 13 engaging a payload 125, ground conditions profile 126 and the steering 127 of the work machine, for example.

The increased transmission command signal 54 may only apply when the engine speed signal 52 is above an anti-stall threshold 129, the anti-stall threshold 129 referring to the minimum engine speed 85 required to keep the engine 64 on the work machine 10 from stalling. Upon reaching an engine speed signal 52 below the anti-stall threshold 129, the transmission command signal 54 may cease to increase.

Figure 5:
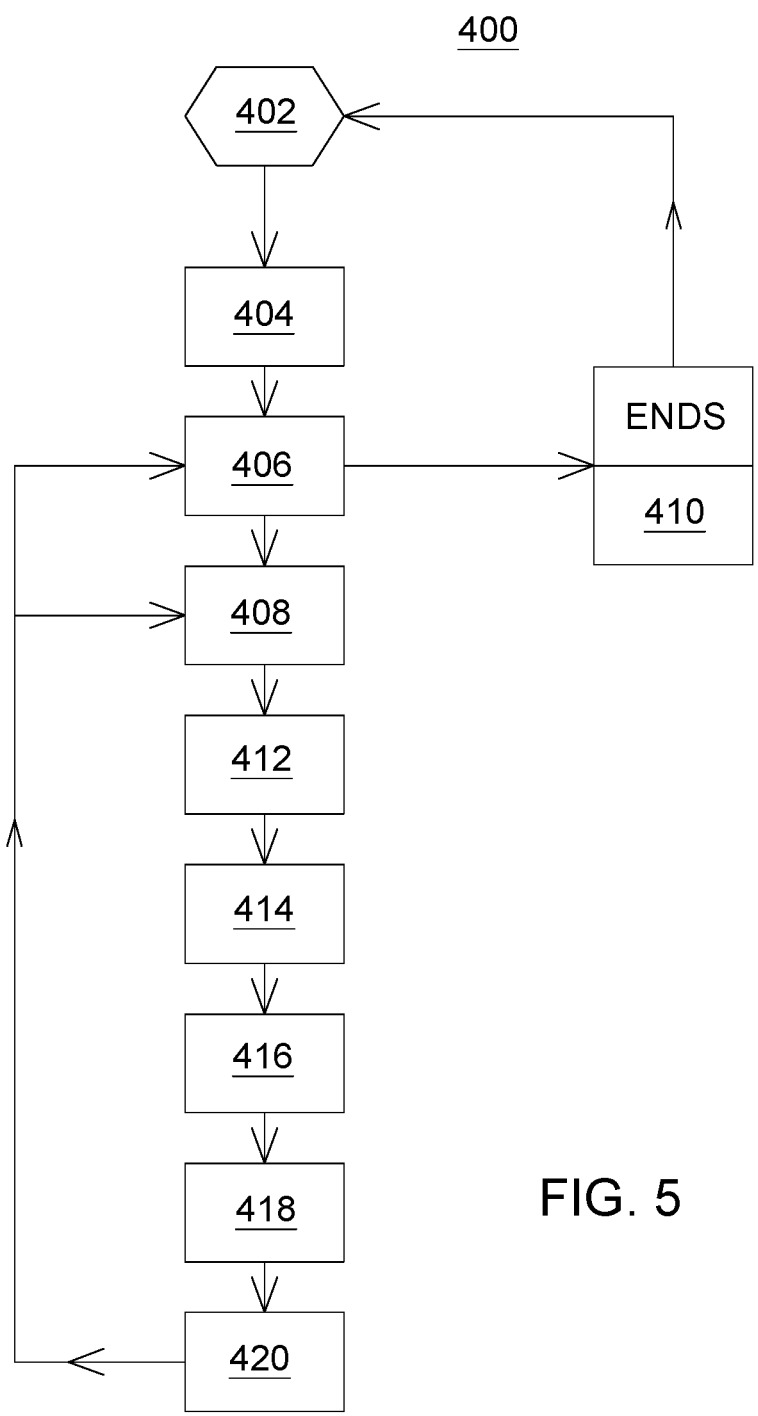
FIG. 5 is a flow chart for a method of operating the system in FIG. 2 for the exemplary embodiment in FIG. 1, according to one embodiment.

Now turning to FIG. 5, a method 400 of compensating reduced track speed 32 because of engine speed droop 120 for a work machine 10 is shown. In one example, the method 400 begins at step 402. At step 404, the method 400 determines, by an engine speed sensor 65 of the work machine 10, an engine speed 85 associated with the work machine 10.

At step 406, the method 400 determines by a controller 84 of the work machine, if the engine speed 85 is above an anti-stall threshold 129. If the engine speed 85 is above an anti-stall threshold 129, the method proceeds to step 408. Otherwise, the method ends at 410, or alternatively upon reaching an engine speed signal 52 below the anti-stall threshold 129, the transmission command signal 54 may cease to increase. At step 412, receiving by the controller 84 an operator input 92 from an operator interface controller 90 wherein the operator 92 input includes a multiplicative factor 94 for one or more of an increased transmission command signal 54 and a target track speed 98 when a drop in the engine speed signal 52 occurs.

At step 414, the method comprises detecting a drop in the engine speed 85. The detection in the drop of the engine speed 85 may be derived from a drop or change in the engine speed signal 52.

At step 416, the controller 84 may calculate an increase in the transmission command signal 54 based on one or more of the engine speed 85, the operator input 92, and a target track speed 98.

At step 418, the controller 84 may generate an increase in the transmission command signal 54 for increasing a motor speed 29 to cause an increase in track speed 32 to compensate at least a portion of the reduced track speed 32 from the engine speed droop 120.

At step 420, the controller 84 may end the increased transmission command signal 54 when one or more of the increased load subsides, the engine speed 85 is modified to reflect sustained longer periods of increased load, or the engine speed 85 drops below the anti-stall threshold 129, to name a few.

As will be appreciated by one skilled in the art, certain aspects of the disclosed subject matter may be embodied as a method, system (e.g., a work vehicle control system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that may contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Aspects of certain embodiments are described herein may be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block (or otherwise described herein) may occur out of the order noted in the figures. For example, two blocks shown in succession (or two operations described in succession) may, in fact, be executed substantially concurrently, or the blocks (or operations) may sometimes be executed in the reverse order, depending upon the functionality involved. It will also be noted that each block of any block diagram and/or flowchart illustration, and combinations of blocks in any block diagrams and/or flowchart illustrations, may be implemented by special purpose hardware based systems that perform the specified functions or acts, or combinations of special purpose hardware and computer instructions.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

One or more of the steps or operations in any of the methods, processes, or systems discussed herein may be omitted, repeated, or re-ordered and are within the scope of the present disclosure.

What is claimed is:

1. A system for compensating reduced track speed because of an engine speed drop for a work machine, the system comprising:
   a frame;
   an attachment coupled to the frame;
   a ground-engaging mechanism adapted to support the frame;
   an engine for driving the ground-engaging mechanism and the attachment, the engine coupled through a variable speed transmission to the ground-engaging mechanism and the attachment, the variable speed transmission including a hydrostatic circuit, the hydrostatic circuit including a pump;
   a motor adapted to further drive the ground-engaging mechanism;
   a track speed sensor adapted to detect a track speed of the ground-engaging mechanism and generate a track speed signal;
   an engine speed sensor adapted to detect an engine speed and generate an engine speed signal; and
   a controller adapted to send an increased transmission command signal based on a drop in the engine speed signal when the work machine engages an increased load, the increased transmission command signal increasing a motor speed to cause an increase in track speed to compensate at least a portion of the reduced track speed from the drop in the engine speed signal.

2. The system of claim 1, wherein the increased transmission command signal causes one or more of an increase in pump flow and a decrease in motor displacement.

3. The system of claim 1 further comprising:
   an operator interface control adapted to receive an operator input, the operator input including a multiplicative factor for one or more of the increased transmission command signal and a target track speed based on the drop in the engine speed signal.

4. The system of claim 3, wherein the multiplicative factor comprises a first setting, a second setting, and a third setting, wherein the first setting including an off position, the second setting including a multiplicative factor of 1:1, and the third setting including a multiplicative factor of X:1.

5. The system of claim 4, wherein the multiplicative factor of X is predefined.

6. The system of claim 1, wherein the drop in the engine speed signal is identified by an inflection point in a torque-engine speed curve.

7. The system of claim 1, wherein the increased transmission command signal is based on the engine speed signal and a target track speed.

8. The system of claim 1, wherein the drop in the engine speed signal is anticipated through a sensory device coupled to the work machine.

9. The system of claim 1, wherein the drop in the engine speed signal is anticipated by a rate of change in the engine speed drop.

10. The system of claim 1, wherein the increased load results from one or more of the attachment engaging a payload, a ground conditions profile, and a steering of the work machine.

11. The system of claim 1, wherein the increased transmission signal only applies when the engine speed signal is above an anti-stall threshold.

12. A system for compensating reduced track speed because of an engine speed drop for a work machine, the system comprising:
    a frame;
    an attachment coupled to the frame;
    a ground-engaging mechanism adapted to support the frame;
    an engine for driving the ground-engaging mechanism and the attachment, the engine coupled through a variable speed transmission to the ground-engaging mechanism and the attachment, the variable speed transmission including a hydrostatic circuit, the hydrostatic circuit including a pump;
    a motor adapted to further drive the ground-engaging mechanism;
    a track speed sensor adapted to detect a track speed of the ground-engaging mechanism and generate a track speed signal;
    an engine speed sensor adapted to detect an engine speed and generate an engine speed signal;
    an operator interface control adapted to receive an operator input, the operator input including a multiplicative factor for one or more of an increased transmission command signal and a target track speed based on a drop in the engine speed signal; and
    a controller adapted to send the increased transmission command signal based on the drop in the engine speed signal when the work machine engages an increased load, the increased transmission command signal increasing a motor speed to cause an increase in track speed to compensate at least a portion of the reduced track speed from the drop in the engine speed signal wherein the increased transmission signal only applies when the engine speed signal is above an anti-stall threshold.

13. The system of claim 12, wherein the multiplicative factor comprises at least two settings, wherein a first setting includes an off position, and a second setting includes a multiplicative factor of X:1.

14. The system of claim 13, wherein the multiplicative factor of X is predefined.

15. A method of compensating reduced track speed because of an engine speed drop for a work machine, the method comprising:
   determining, by an engine speed sensor of the work machine, an engine speed associated with the work machine;
   determining, by a controller of the work machine, if the engine speed is above an anti-stall threshold;
   determining, by a track speed sensor of the work machine, a track speed of a ground-engaging mechanism of the work machine;
   receiving by the controller an operator input from an operator interface control, the operator input including a multiplicative factor for one or more of an increased transmission command signal and a target track speed when a drop in the engine speed occurs;
   detecting a drop in the engine speed signal;
   calculating an increase in the transmission command signal by the controller based on one or more of the engine speed signal, the operator input, and a target track speed; and
   generating an increase in the transmission command signal for increasing a motor speed to cause an increase in track speed to compensate at least a portion of the reduced track speed from the drop in the engine speed signal.

16. The method of claim 15, wherein the increase in the transmission command signal causes one or more of an increase in pump flow and a decrease in motor displacement.

17. The method of claim 16, wherein the multiplicative factor comprises a first setting a second setting, and a third setting, wherein the first setting including an off position, the second setting including a multiplicative factor of 1:1, and the third setting including a multiplicative factor of X:1.

18. The method of claim 17, wherein the multiplicative factor of X is predefined.

19. The method of claim 15, wherein the drop in the engine speed signal is identified by an inflection point in a torque-engine speed curve.

20. The method of claim 15, wherein the drop in the engine speed signal is anticipated through a sensory device coupled to the work machine.

* * * * *